United States Patent
Kahn et al.

(10) Patent No.: US 6,505,055 B1
(45) Date of Patent: *Jan. 7, 2003

(54) CAMEL-BACK DIGITAL ORGANIZER AND COMMUNICATION PROTOCOL FOR A CELLULAR PHONE DEVICE

(75) Inventors: Philippe R. Kahn, Scotts Valley, CA (US); Eric O. Bodnar, Santa Cruz, CA (US)

(73) Assignee: Starfish Software, Inc., Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,732

(22) Filed: May 1, 1998

Related U.S. Application Data

(63) Continuation of application No. 08/905,463, filed on Aug. 4, 1997.
(60) Provisional application No. 60/080,295, filed on Mar. 31, 1998.

(51) Int. Cl.[7] ............................................. H04Q 7/20
(52) U.S. Cl. ...................................... 455/556; 455/557
(58) Field of Search ............................... 455/566, 550, 455/551, 556, 557, 418, 419, 420, 417, 564; 379/354, 355; 707/200, 201, 202, 204, 9; 340/7.21, 7.1, 825.4, 7.23, 7.52

(56) References Cited

U.S. PATENT DOCUMENTS

| | | | |
|---|---|---|---|
| 4,769,796 A | 9/1988 | Levine | 368/29 |
| 4,866,611 A | 9/1989 | Cree et al. | 364/300 |
| 4,881,179 A | 11/1989 | Vincent | 364/518 |
| 4,977,520 A | 12/1990 | McGaughey, III et al. | 364/521 |
| 5,113,380 A | 5/1992 | Levine | 368/10 |
| 5,189,632 A * | 2/1993 | Paajanen et al. | 455/556 |
| 5,224,212 A | 6/1993 | Rosenthal et al. | 395/250 |
| 5,249,218 A | 9/1993 | Sainton | |

(List continued on next page.)

Primary Examiner—Dwayne Bost
Assistant Examiner—Jean A Gelin
(74) Attorney, Agent, or Firm—John A. Smart; Darryl A. Smith

(57) ABSTRACT

A "Camel-Back" Digital Organizer (CDO) system is described that is designed to attach to a cellular phone in the same manner as an auxiliary battery, and to interface with the phone through contact points available in the phone's interface port. The CDO system is preferably implemented as an add-on component which can be easily attached and detached from a phone by a user and, once in place, can dramatically enhance the phone's functionality, converting the phone into a "smart" phone. The CDO unit includes a main housing supporting, on its back or upper surface, a set of input/navigation buttons and a display screen. The set of buttons comprise a circular pad or circular configuration of buttons, placed at the bevel end of the unit, which are designed as a directional navigation disc or "NaviDisc." The NaviDisc provides for LEFT, RIGHT, UP, DOWN, and SELECT buttons (i.e., five buttons total). The unit also includes a second of set of buttons along its top edge, which are designed to mimic the rubber buttons on the phone itself. Communication methodologies of the present invention are described for facilitating use of the organizer component with a host cellular phone. Exemplary methods include: a method supporting user-initiated voice call from the organizer; a method supporting synchronization of a host phone list (e.g., contact information list) with a corresponding digital organizer list; and a method providing a synchronization protocol between the digital organizer and any host (e.g., PC or server).

26 Claims, 10 Drawing Sheets

U.S. PATENT DOCUMENTS

| | | | | |
|---|---|---|---|---|
| 5,392,390 A | | 2/1995 | Crozier | 395/161 |
| 5,428,666 A | * | 6/1995 | Fyfe et al. | 455/551 |
| 5,442,783 A | | 8/1995 | Oswald et al. | 395/600 |
| 5,519,606 A | | 5/1996 | Frid-Nielsen et al. | 364/401 |
| 5,522,089 A | | 5/1996 | Kikinis et al. | |
| 5,533,097 A | * | 7/1996 | Crane et al. | 455/552 |
| 5,590,382 A | * | 12/1996 | Kikinis et al. | 395/893 |
| 5,625,673 A | | 4/1997 | Grewe et al. | |
| 5,630,159 A | * | 5/1997 | Zancho | 235/375 |
| 5,640,689 A | * | 6/1997 | Rossi | 455/129 |
| 5,666,530 A | * | 9/1997 | Clark et al. | 707/201 |
| 5,666,553 A | | 9/1997 | Crozier | 395/803 |
| 5,675,524 A | * | 10/1997 | Bernard | 708/109 |
| 5,684,990 A | | 11/1997 | Boothby | 395/619 |
| 5,701,423 A | | 12/1997 | Crozier | 395/335 |
| 5,710,922 A | | 1/1998 | Alley et al. | 395/617 |
| 5,727,202 A | | 3/1998 | Kucala | 395/610 |
| 5,729,735 A | | 3/1998 | Meyering | 395/610 |
| 5,758,150 A | | 5/1998 | Bell et al. | 395/610 |
| 5,758,355 A | | 5/1998 | Buchanan | 707/201 |
| 5,778,346 A | | 7/1998 | Frid-Nielsen et al. | 705/9 |
| 5,778,389 A | | 7/1998 | Pruett et al. | 707/204 |
| 5,797,089 A | * | 8/1998 | Nguyen | 455/557 |
| 5,812,946 A | * | 9/1998 | Nakabayashi et al. | 455/426 |
| 5,832,487 A | | 11/1998 | Olds et al. | 707/10 |
| 5,845,293 A | | 12/1998 | Veghte et al. | 707/202 |
| 5,854,984 A | * | 12/1998 | Buhrmann et al. | 340/7.1 |
| 5,859,628 A | * | 1/1999 | Ross | 345/173 |
| 5,878,282 A | | 3/1999 | Mital | 235/492 |
| 5,894,595 A | * | 4/1999 | Foladare et al. | 455/459 |
| 5,907,815 A | | 5/1999 | Grimm et al. | |
| 5,960,367 A | * | 9/1999 | Kita | 455/597 |
| 5,966,663 A | * | 10/1999 | Gleason | 455/466 |
| 5,974,238 A | * | 10/1999 | Chase, Jr. et al. | 707/203 |
| 5,978,685 A | * | 11/1999 | Laiho | 455/556 |
| 5,983,073 A | * | 11/1999 | Ditzik | 455/556 |
| 6,034,621 A | * | 3/2000 | Kaufman | 340/825.44 |
| 6,049,796 A | * | 4/2000 | Siitonen et al. | 707/3 |
| 6,148,193 A | * | 11/2000 | Miska et al. | 455/410 |
| 6,266,539 B1 | * | 7/2001 | Pardo | 379/93.05 |

\* cited by examiner

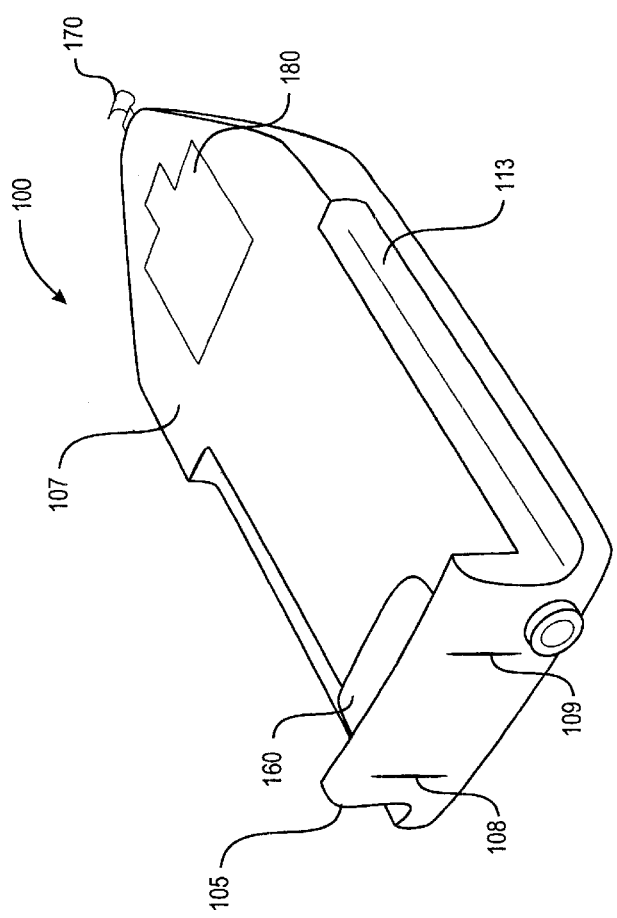
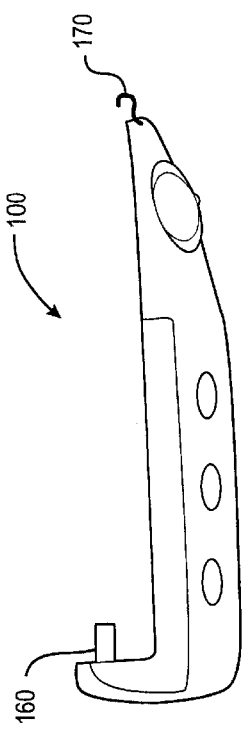
FIG. 1D
FIG. 1E

CAMEL-BACK DIGITAL ORGANIZER AND COMMUNICATION PROTOCOL FOR A CELLULAR PHONE DEVICE

RELATED APPLICATIONS

The present application is related to and claims the benefit of priority from commonly-owned U.S. patent application Ser. No. 60/080,295, filed Mar. 31, 1998, and entitled, Camel-Back Digital Organizer, the disclosure of which is hereby incorporated by reference which is a con of U.S. patent application Ser. No. 08/905,463, filed Aug. 4, 1997, and entitled, User Interface Methodology for Microprocessor Device Having Limited User Input, the disclosure of which is hereby incorporated by reference. The present application is also related to commonly-owned, concurrently-filed U.S. patent application Ser. No. 09/071,748, filed May 1, 1998, and entitled, Camel-Back Digital Organizer for a Cellular Phone Device.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to electronic organizers and, more particularly, to apparatus and methods providing integration of electronic organizers with cellular phone devices.

With each passing day, there is ever increasing interest in providing integrated solutions for connected information appliances. Here, the general environment includes "appliances" in the form of electronic devices such as cellular phones, pagers, and battery-powered, hand-held devices (e.g., REX™, Palm Pilot™ and Windows™ CE devices). Such a device, in typical use, is occasionally connected to a desktop personal computer or PC, which stores information for the user. Still further, the PC may be connected to a server computer, which stores information important to the user's business. What the user really wants is an integrated solution such that information of each device remains available for use in other devices in a convenient, transparent manner.

This is particularly the case for cellular phones, given their tremendous popularity. Although cellular phones are commonplace, a cellular phone user today finds that his or her device is not well integrated with other electronic devices. Consider, for instance, a user who maintains address-book or "contacts" information on a hand-held device. Despite having maintained extensive information about his or her contacts electronically, the user is forced to manually re-enter information into the cellular phone when placing a phone call. What the user wants instead is the ability to make calls and look up addresses and phone numbers, even check schedules and send electronic mail, from a single integrated solution. Yet to date, designers have struggled over how to integrate disparate information—such as calendaring, scheduling, and contact information—among disparate devices.

What is needed is a solution which combines telephony with personal information management in a single integrated hand-held unit. Given the millions of cellular phones in service today, such a solution would comprise a user-serviceable attachment allowing a legacy phone to be upgraded to a "smart" phone without requiring a change to the underlying phone equipment (i.e., in a manner which maintains compatibility with legacy hardware) and without requiring a complicated installation procedure. The present invention fulfills this and other needs.

SUMMARY OF THE INVENTION

The present invention provides a "Camel-Back" Digital Organizer (CDO) unit or system, that is designed to attach to a cellular phone in the same manner as an auxiliary battery, and to interface with the phone through contact points available in the phone's interface port (e.g., StarTac™ cellular port). The CDO unit is preferably implemented as an add-on component which can be easily attached and detached from a phone by a customer and, once in place, can dramatically enhance the phone functionality, converting the phone into a "smart" phone.

The CDO unit comprises a digital organizer having a main housing supporting, on its back or upper surface, a set of input/navigation buttons and a display screen. The set of buttons comprise a circular pad or circular configuration of buttons, placed at the bevel end of the unit, which are designed as a directional navigation disc or "NaviDisc." The NaviDisc provides for LEFT, RIGHT, UP, DOWN, and SELECT buttons (i.e., five buttons total). The unit's housing includes a gentle slope for facilitating user access to these buttons. The unit also includes a second set of buttons along its top edge, which are designed to mimic the rubber buttons on the phone itself.

In one embodiment, the present invention provides an electronic organizer allowing for independent operation and for operation with a telephone, and includes the following basic elements: a housing having an exterior surface and defining an interior; a memory in the interior of the housing for storing data; a user-visible display coupled to the housing and the memory for selectively displaying the data within the memory, wherein the display is operable when the organizer is physically independent of the telephone; and at least one connector coupled to the housing for removably mating the organizer onto the telephone to form an enhanced telephone unit. The connector includes a signal conductor for communicating data to the cellular or wireless telephone. In another embodiment, the present invention provides an enhanced telephone comprising a target telephone capable of stand-alone use by a user, the target telephone comprising a telephone housing; and an electronic organizer capable of stand-alone use by a user to organize data, the electronic organizer comprising a housing structure that includes a connector configured to removably attach the electronic organizer to the target telephone such that the combination of target telephone and electronic organizer is a physically integrated unit. In another embodiment, the invention provides a portable device for carrying data and attaching to a telephone to enhance the telephone, the telephone having at least one battery attachment location and a communication interface port, the portable device comprising a device housing having an upper surface; a memory underlying the device housing for storing the data; and at least one mechanical connector on the device housing configured to couple the portable device to the telephone at the battery attachment location.

In another embodiment, the present invention provides a portable electronic organizer for carrying data and attaching to a cellular or wireless telephone to enhance the wireless telephone, the wireless telephone having an existing attachment location selected from the set consisting of an existing battery attachment location and an existing communication interface port that carries telephonic communication, the portable organizer comprising a memory for storing the data; and a housing structure for containing at least the memory and configured to mate with the existing attachment location to make the electronic organizer and the wireless telephone together a handheld enhanced telephone. In yet another embodiment, the present invention provides a portable device for carrying data and attaching to a telephone to enhance the telephone, the telephone having at least one battery attachment location and a communication interface port, the portable device comprising a device housing having an upper surface; a memory for storing the data; and at least one mechanical connector on the device housing configured to couple the portable device to the telephone at the battery attachment location.

The recommended power supply for the portable organizer unit may be a conventional organizer power supply, such as a set of stacked watch batteries (e.g., CR2025) which are inserted into a battery compartment on the back side of the unit. A simple clip or screw cover is used to seal the compartment. The power consumption of the unit will, in typical use, be minimal such that a battery life of six months or better is realistic. Alternatively, the portable organizer may be adapted to selectively receive power for its operation from at least one of the organizer power supply or the telephone power supply. Similarly, the organizer power supply may be adapted to provide power to at least one of the portable organizer and the telephone, for operation thereof. Also, the portable organizer may be adapted to receive power for its operation from the organizer power supply for operation of the portable organizer, the organizer power supply may be adapted to withhold power from the telephone for operation of the telephone, where the portable organizer is capable of operation even if the telephone power supply is exhausted.

In typical use, the CDO device is used in tandem with a desktop computer or PC. The desktop PC is used by the user when "at the office," and the CDO device is employed when the user is "on the road" (i.e., out of the office). Thus during typical use, large repositories of data reside on the desktop PC which are periodically transferred or synchronized with data residing on the portable CDO device. Multiple techniques exist for getting data from the desktop PC to the portable computing device, through device port(s). Using a device input/output (I/O) protocol or standard, data can be streamed from the desktop PC to the portable computing device via a direct cable (or infrared) connection, such as using a serial port-to-serial port connection. To facilitate communication of the CDO unit with devices other than the host phone, therefore, the unit includes at its base a small input/output stereo jack or coupler to be used, in conjunction with a plug-in cable, as a serial synchronization connection to an external device, such as a PC. The jack is exposed even when the unit is clipped onto the phone, allowing a user to connect the CDO unit to a PC without having to unclip it.

The CDO unit includes an interface for connecting a digital organizer to a cellular phone. The interface includes an attachment means for occasionally attaching the digital organizer to the cellular phone; a connection means for establishing communication between the digital organizer and the cellular phone, when the digital organizer is attached to the cellular phone; and a communication means for sending commands from the digital organizer to the phone for establishing a communication session between the digital organizer and the phone.

The CDO unit embodies system and application software. The system software includes a single purpose operating system (SPOS) which functions to provide a consistent mechanism by which applications can communicate with the device. In this manner, applications are shielded from hardware complexity, such as hardware interrupts and ports. Software application programs or modules are provided for user operation of the device. The application programs can be implemented as individual modules, which are controlled by a "module selector." The module selector serves as a user interface or shell representing the top-level or "home" display presented to a user. In the currently-preferred embodiment, the module selector presents the user with selection icons for navigating to different applications or modules of functionality. In an exemplary embodiment, the applications include a contact module for addresses and phone numbers, a schedule module for calendar events, a "to do" list for various tasks, a memos module for arbitrary text documents, a world time module for clock settings and world travel time translations and a preferences module for various device settings and configurations. The applications interface with the phone through the phone's interface connector. For instance, a customer can look up a phone number for a person in the contact module and press a button to initiate a call to that number.

Communication methodologies of the present invention are described for facilitating use of the organizer component with a host cellular phone. Exemplary methods include: a method supporting user-initiated voice call from the organizer; a method supporting synchronization of a host phone list (e.g., contact information list) with a corresponding digital organizer list; and a method providing a synchronization protocol between the digital organizer and any host (e.g., PC or server).

An exemplary method for communicating between a digital organizer and a host phone includes steps of selectively connecting the digital organizer to the phone, so that each can communicate with the other; displaying at the digital organizer a list comprising entries having phone number information; receiving input indicating a user request to dial a particular phone number displayed on the list; sending a first command from the digital organizer to the phone for attempting to establish a communication session between the digital organizer and the phone; and if a communication session can be established between the digital organizer and the phone, transmitting a second command from the digital organizer to the phone which instructs the phone to dial the particular phone number.

An exemplary method of synchronizing a phone list stored on a host phone with a corresponding list stored on a digital organizer includes steps of selectively connecting the digital organizer to the phone so that each can communicate with the other; receiving a request to synchronize the list stored on the digital organizer with the list stored on the phone; sending a first command from the digital organizer to the phone for attempting to establish a communication session between the digital organizer and the phone; transmitting a second command from the digital organizer to the phone requesting synchronization between the list stored on the digital organizer and the list stored on the phone, if a communication session can be established between the digital organizer and the phone; determining which list takes precedence during synchronization; and updating the list stored at the phone from the list stored at the digital organizer, otherwise updating the list stored at the digital organizer from the list stored at the phone, if the list stored on the digital organizer takes precedence.

The present invention further provides a method for providing a smart interface to a telephone which comprises the steps of providing an electronic organizer having a microprocessor and a connector that attaches to the handheld telephone to form a physically integrated unit; accepting user input on the electronic organizer when the electronic organizer is attached to the telephone; and in response to the user input, instructing by the microprocessor the handheld telephone to dial a telephone number.

BRIEF DESCRIPTION OF THE DRAWINGS

FIG. 1D is a diagram, in perspective view, illustrating the underside surface of the CDO unit.

FIG. 1E is a diagram illustrating a lateral view of the unit.

DETAILED DESCRIPTION OF A PREFERRED EMBODIMENT

Camel-Back Digital Organizer

A. Introduction

In accordance with the present invention, an ideal digital organizer should have a low-profile form factor, so that it is easily accommodated by a target cellular phone device. It should be a self-contained unit, so that it can operate independently of the target cellular phone device. It should, for instance, maintain a separate power supply so that its operation is not tied to the battery life of the target cellular phone device. The ideal digital organizer should also maintain some level of connectivity with the host (i.e., a cellular phone), typically through a conventional port provided by the cellular phone. Common to most cellular phones is an optional auxiliary battery attachment. Also common is an interface port (e.g., StarTac™ cellular port), usually used to attach the phone to a laptop computer for portable communication purposes. These aspects of existing cellular phone hardware are exploited to provide a digital organizer system with the foregoing features.

For purposes of illustration, the following discussion focuses on a digital organizer which has as its target or host phone the popular Motorola StarTac™ model cellular phone. For aesthetic purposes, the design closely matches the physical appearance of the phone's auxiliary battery. The design, construction, and operation taught by the present invention are not limited, however, to StarTac model phones but can be applied advantageously to other phones, including ones of markedly different design and style.

B. Mechanical Design

Figure 1A:
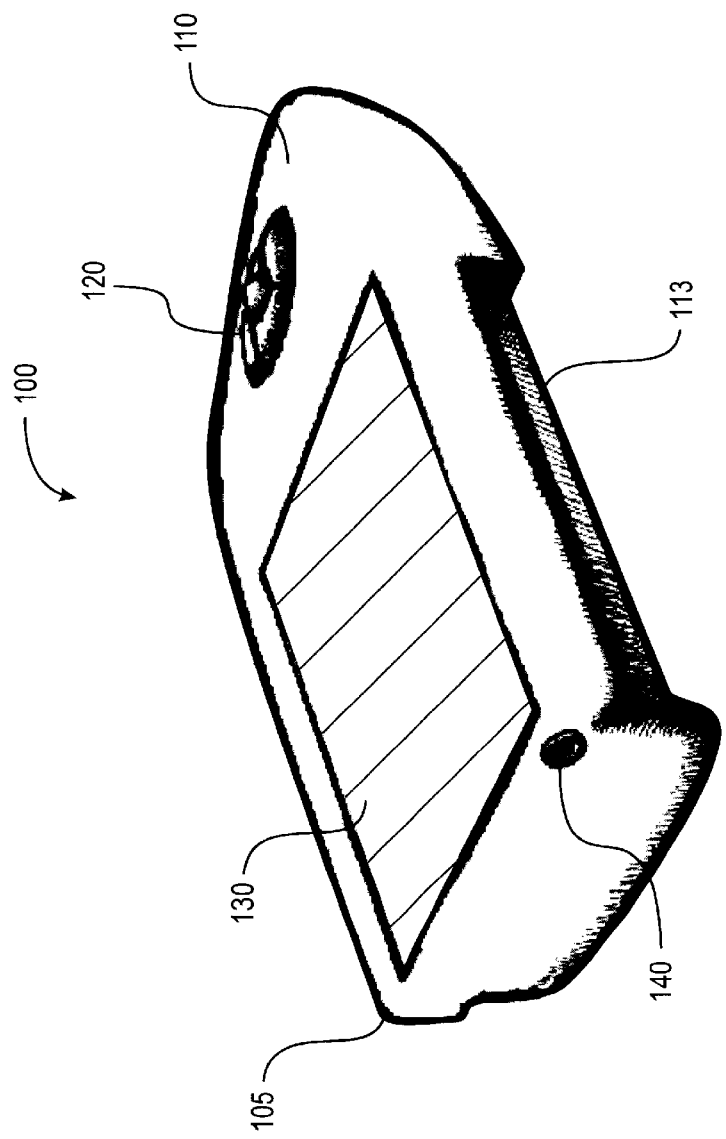
FIG. 1A is a diagram, in perspective view, illustrating a "camel-back" digital organizer (CDO unit) of the present invention.
Figure 1B:
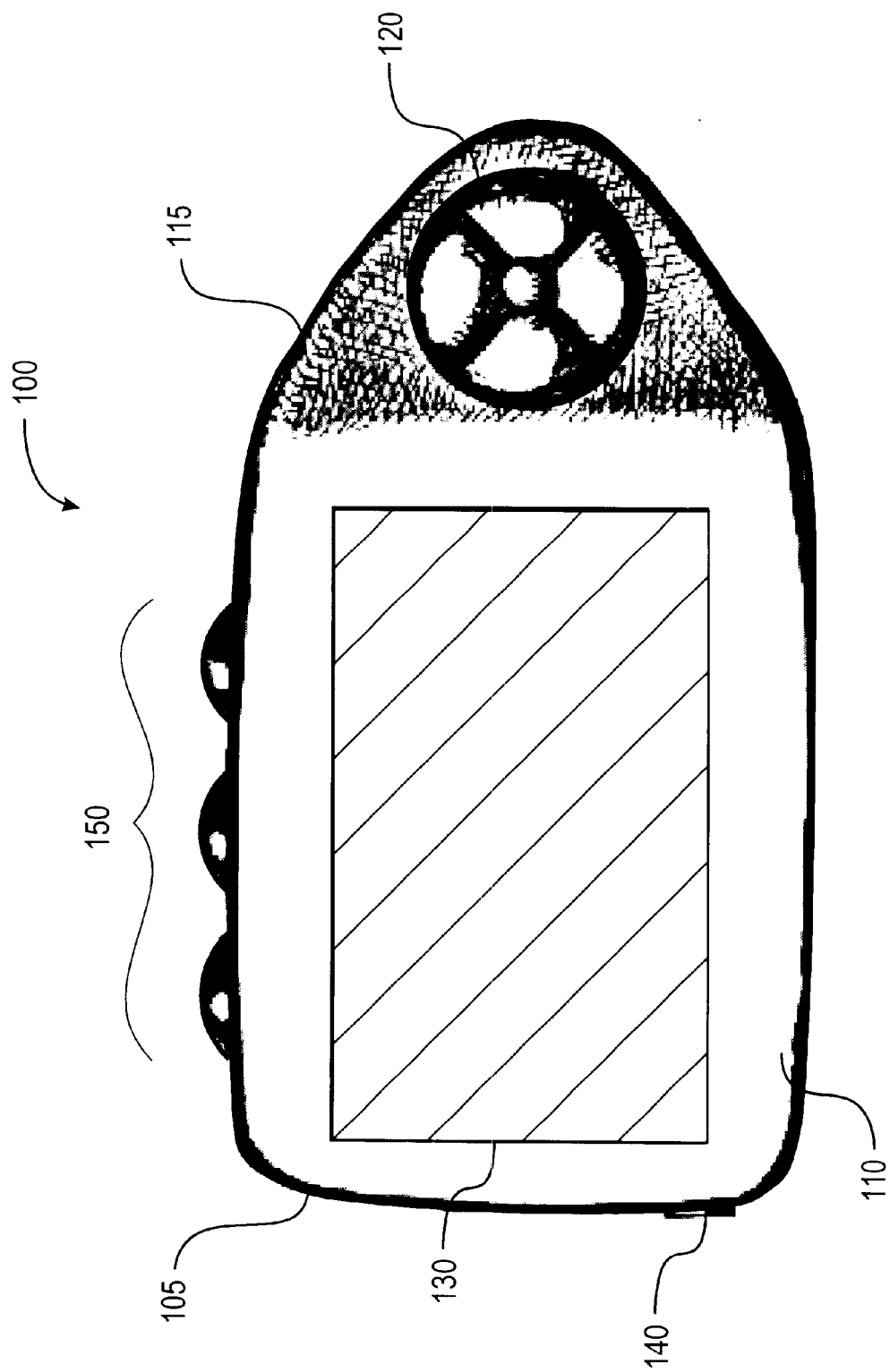
FIG. 1B is a diagram illustrating the housing of the CDO unit, which includes a gentle slope for facilitating user access to input buttons.

The present invention provides a "Camel-Back" Digital Organizer (CDO) system 100, illustrated in FIGS. 1A–B, that is designed to attach to a cellular phone in the same manner as an auxiliary battery, and to interface with the phone through the contact points in the interface port. The CDO system is preferably implemented as an add-on component which can be easily attached and detached from a phone by a user and, once in place, can dramatically enhance the phone's functionality, converting the phone into a "smart" phone.

Figure 1C:
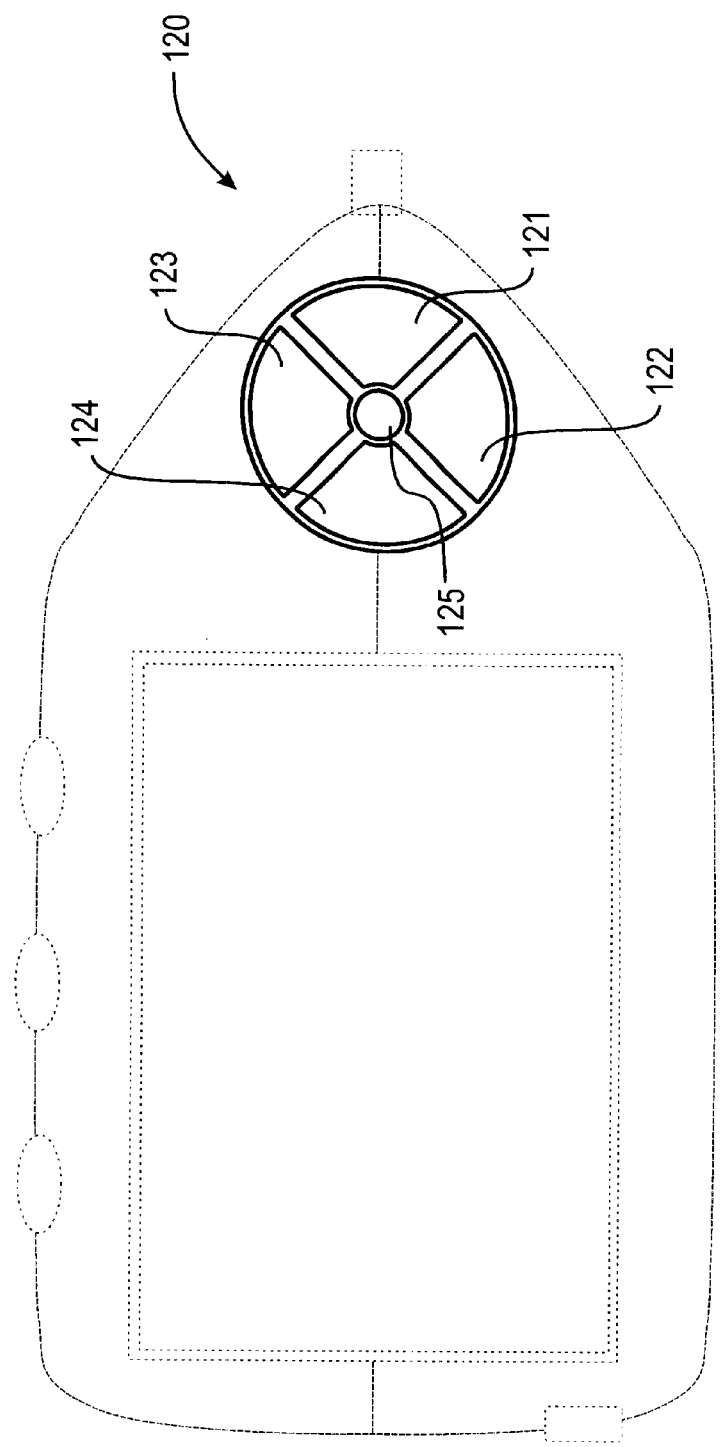
FIG. 1C is a diagram illustrating a "NaviDisc" which provides LEFT, RIGHT, UP, DOWN, and SELECT buttons.

As shown in perspective view in FIG. 1A, the CDO unit or system 100 comprises a digital organizer having a main housing 105 supporting, on its back or upper surface 110, a set of input/navigation buttons 120 and a display screen 130. The set of buttons 120 comprise a circular pad or circular configuration of buttons, placed at the bevel end of the unit, which are designed as a directional navigation disc or "NaviDisc." As shown in the elevational view in FIG. 1B, the unit 100 includes a second of set of buttons 150 along a top edge of the unit which are designed to mimic the rubber buttons on the phone itself. As shown in further detail in FIG. 1C, the NaviDisc 120 provides for LEFT 123, RIGHT 122, UP 121, DOWN 124 and SELECT 125 buttons (i.e., five buttons total). As shown in FIG. 1B, the housing includes a gentle slope 115 for facilitating user access to these buttons.

In typical use, the CDO device is used in tandem with a desktop computer or PC. The desktop PC is used by the user when "at the office," and the CDO device is employed when the user is "on the road" (i.e., out of the office). Thus during typical use, large repositories of data reside on the desktop PC which are periodically transferred or synchronized with data residing on the portable CDO device. Multiple techniques exist for getting data from the desktop PC to the portable computing device, through device port(s). Using a device input/output (I/O) protocol or standard, data can be streamed from the desktop PC to the portable computing device via a direct cable (or infrared) connection, such as using a serial port-to-serial port connection. To facilitate communication of the CDO unit 100 with devices other than the host phone, therefore, the unit 100 includes at its base a small input/output stereo jack or coupler 140 to be used, in conjunction with a plug-in cable, as a serial synchronization connection to an external device, such as a PC. The jack is exposed even when the unit is clipped onto the phone, allowing a user to connect the CDO unit to a PC without having to unclip it.

In a preferred embodiment, the display screen 130 on the unit is a Citizen™ high contrast LCD (liquid crystal display) display (Citizen Part No. 5104, available from Citizen of Japan); the display includes a pixel grid designed to support a graphical user interface. The display is used to render a combination of text and graphics as part of a graphical user interface. In the preferred embodiment, the display is a monochrome LCD display, for instance with approximately 160×100 pixel resolution, and includes a clear plastic window over the LCD glass for shock resistance. In use, the unit is held such that the surface 110 generally faces toward the user when the unit is being used as an organizer (with or without attachment to a host phone), so that the user has ready access to the unit's two button sets and can easily view information on the display 130. As also illustrated in the perspective view, the housing 105 includes lateral recesses 113 which facilitate placement of the unit within the auxiliary battery compartment of a host cellular phone. When the host phone is in use (to place a voice call), the unit is held such that the surface 110 fits in the palm of the user's hand, that is, generally held in a manner such that the display 130 is facing away from the user's view.

FIG. 1D provides a perspective view of the underside surface 107 of the unit 100. An additional lateral view is provided by FIG. 1E. The CDO unit 100 clips onto the phone in the same manner as the phone's auxiliary battery. At the bevel end of the unit 100 is a metal spring connector 170 which grips the top of the phone and which extends to allow the user to line up and attach the bottom portion of the unit. At the bottom end of the housing 105 are two plastic connectors 108, 109 which fit into slots on the phone and hold the unit in place.

Also at the bottom is a communication interface plug or connector 160 which snaps into a corresponding communication interface port of the phone (e.g., StarTac™ cellular port). The communication connector is designed to access the phone interface connector directly. The power requirements and pin-outs are designed to meet the interface connector specification of the target phone being supported (e.g., Motorola specification for a Motorola StarTac™). Through this connector or "smart" interface, the CDO can issue telephony requests to initiate a dial, for instance. If desired, the connector 160 can include a flexible plastic hinge to allow for better alignment of the pins as the unit is clipped on by the user.

The actual procedure for clipping the CDO unit 100 onto a host phone is simple. The user first slips the metal spring connector into a corresponding slot on the phone then pulls down to extend the bottom pins over the base of the phone. Then, the user lines up the bottom pins with the slots at the base of the phone and releases the spring, thus allowing the base pins to slide into place. As a final step, the user presses on the back of the connector hinge to ensure that the connector is firmly in place. This is essentially the same simple procedure as attaching the auxiliary battery.

With existing battery technology, talk time for the cellular phone is relatively limited, on the order of hours. In the preferred embodiment, the power supply for the unit or device 100 is preferably separated from that of the phone so that the device can operate independently of the phone's power status; thus, the limited battery life for the cellular phone does not become a limiting factor for the organizer. In this manner, the user can continue to use the organizer even if he or she has run out of talk time for the cellular phone. Still further, the user can detach the organizer component from the combined unit and continue to use it, without having to also carry the comparatively-larger cell phone component with its dead battery. Not only does the user continue to have access to contact database information, but the user also continues to have access to the scheduling and alarm functionality provided by the organizer. The recommended power supply for the portable organizer unit may be a conventional organizer power supply, such as a set of stacked watch batteries (e.g., CR2025) which are inserted into a battery compartment 180 on the back side 107 of the unit 100, as illustrated in FIG. 1D. A simple clip or screw cover is used to seal the compartment. The power consumption of the unit will, in typical use, be minimal such that a battery life of six months or better is realistic.

Alternatively, the portable organizer may be adapted to selectively receive power for its operation from at least one of the organizer power supply or the telephone power supply. Similarly, the organizer power supply may be adapted to provide power to at least one of the portable organizer and the telephone, for operation thereof. Also, the portable organizer may be adapted to receive power for its operation from the organizer power supply for operation of the portable organizer, the organizer power supply may be adapted to withhold power from the telephone for operation of the telephone, where the portable organizer is capable of operation even if the telephone power supply is exhausted. Additionally (or in the alternative), the organizer may include an auxiliary power supply adapted to supply the organizer and/or telephone, for operation thereof.

Figure 1F:
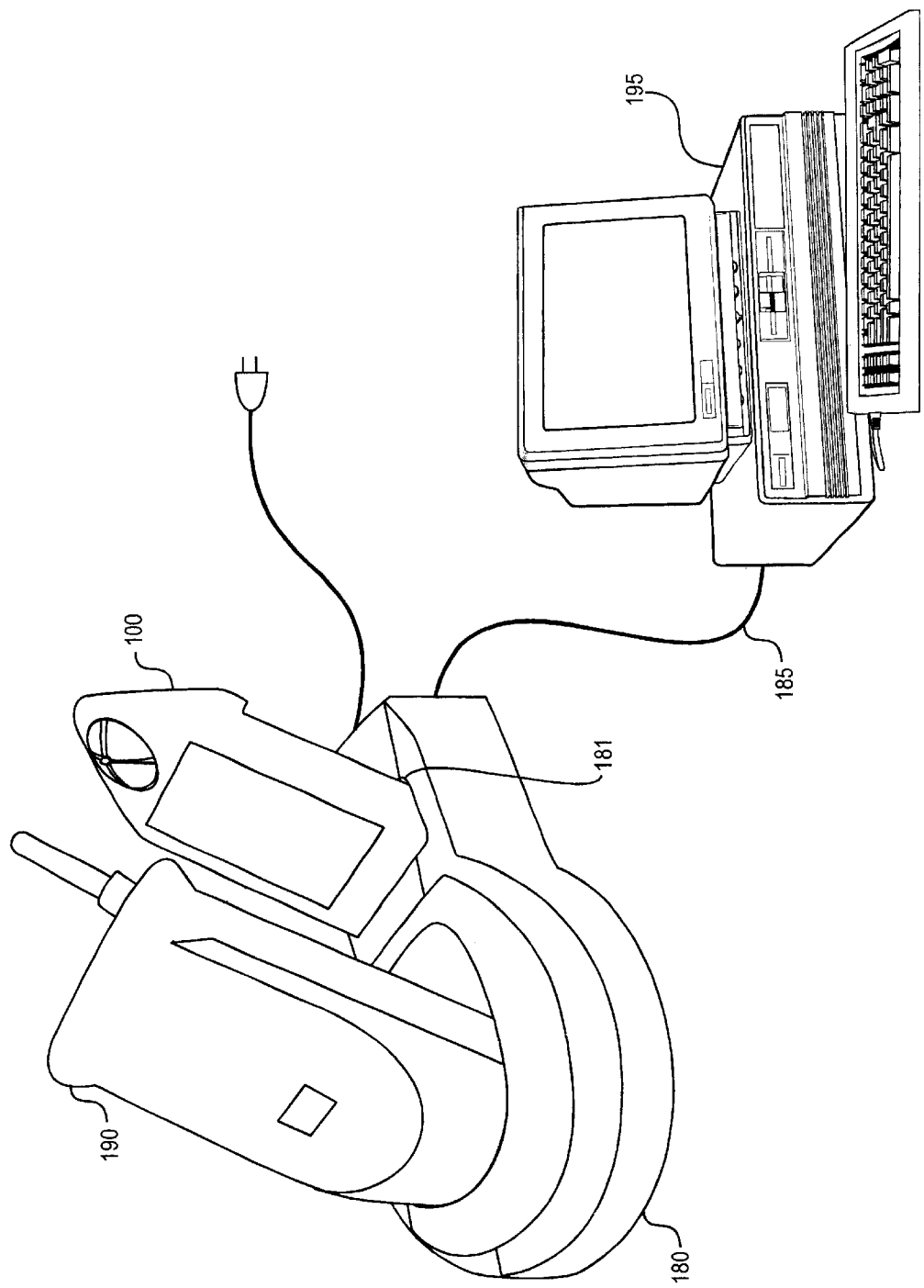
FIG. 1F is a diagram illustrating a desktop charging station which can charge the batteries on a phone as well as an auxiliary battery or the CDO unit.

A host phone typically includes as a standard accessory a desktop charging station which can charge the batteries on the phone as well as an auxiliary battery. As shown in FIG. 1F, a StarTac cellular phone 190 includes (as an accessory) a charging station or base 180. The charging base 180 includes an auxiliary battery cradle or slot 181, for accommodating an auxiliary battery. The slot 181 readily accommodates the CDO unit 100. With a minor modification, this same charging station may be adapted to both charge the phone batteries as well as synchronize information on the CDO unit using a serial cable connected to a desktop PC. As shown, for instance, the charging base 180 is modified to include a serial communication link 185, thereby establishing serial communication between the unit 100 (via its serial connector jack) and a desktop computer 195 via a RS-232 serial port; the RS-232 or Recommended Standard-232 is a standard interface approved by the Electronic Industries Association (EIA) for connecting serial devices.

C. Device Hardware

Figure 2:
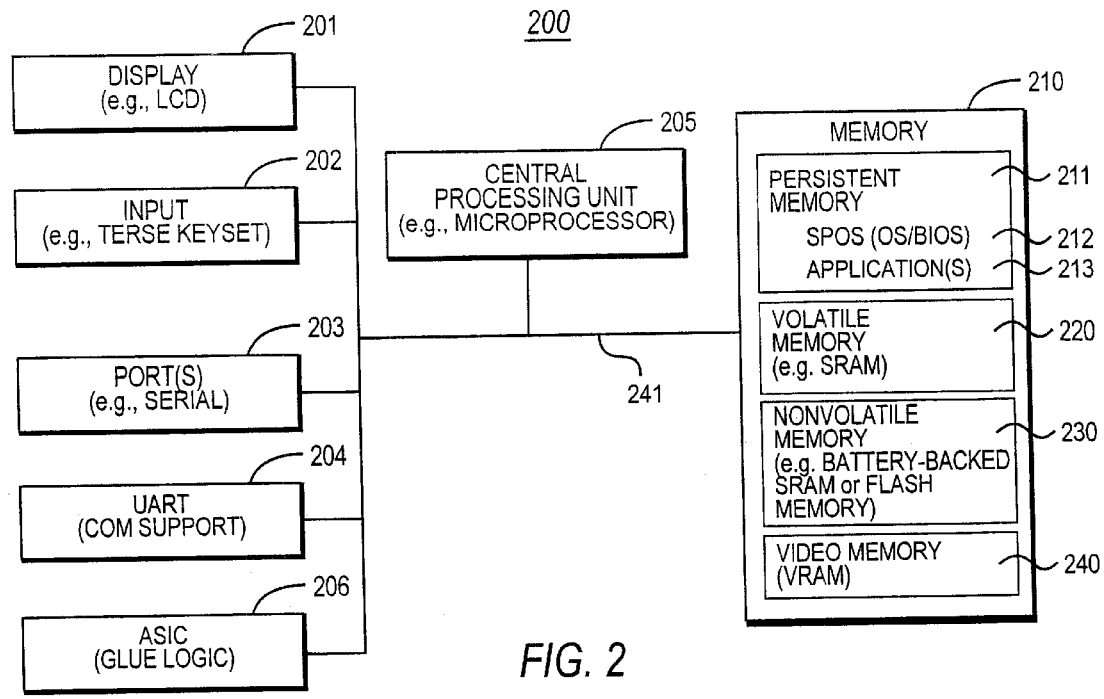
FIG. 2 is a block diagram illustrating the general hardware architecture of the CDO unit.

FIG. 2 is a block diagram illustrating the general hardware architecture of a camel-back portable computing device or digital organizer in which the present invention may be embodied. As shown, the CDO unit 100 includes motherboard circuitry 200 comprising a low power 8-bit central processing unit (CPU) 205, a memory 210, a display 201, an input 202, ports 203, a UART 204, and an ASIC (Application Specific Integrated Circuit) 206, all connected via a system bus 241 (or similar architecture). The CPU 205 may comprise a Toshiba® Z80-compatible microprocessor, such as Toshiba Part No. T6B31, available from Toshiba America, Inc. of New York, N.Y. The Display 201 includes a screen device and supporting circuitry for displaying information, such as a liquid crystal display (LCD) display screen 130 previously shown in FIG. 1A. The Input 202 comprises a key set, either physical or logical (e.g., on screen buttons), and supporting circuitry. As previously described, a terse set comprising two separate groups or subsets is employed. Memory 210 comprises persistent memory 211, volatile memory 220, non-volatile RAM memory 230, and video memory (VRAM) 240. Persistent memory 211 is typically implemented as a ROM or read-only memory. As shown, it stores a single-purpose operating system (SPOS) 212 and application(s) 213. Volatile memory 220 is a "scratch" memory, for storing temporary computation results. It typically is implemented as Static RAM (random-access memory) or SRAM, for providing a work space for the operating system and applications. Non-volatile RAM memory 230 represents battery-backed SRAM memory or Flash memory, for storing context information from one session to another. When the device 200 is powered down, the memory 230 stores user data from that session. The UART (Universal Asynchronous Receiver-Transmitter) 204 handles asynchronous serial communication through the stereo connector, which receives a plug-in cord providing a null-modem serial connection to another device. The ASIC (Application Specific Integrated Circuit) logic 206 serves to link the components together and drive the interface connector to the phone as well as power management circuitry for the device. With this design, the unit consumes very little power and yields extremely long battery life.

D. Device Software

1. General

The single purpose operating system (SPOS) functions to provide a consistent mechanism by which applications 213 can communicate with the device. In this manner, applications 213 are shielded from hardware complexity, such as hardware interrupts and ports. In other words, it serves to abstract hardware complexity to a high-level application programming interface (API).

Figure 3:
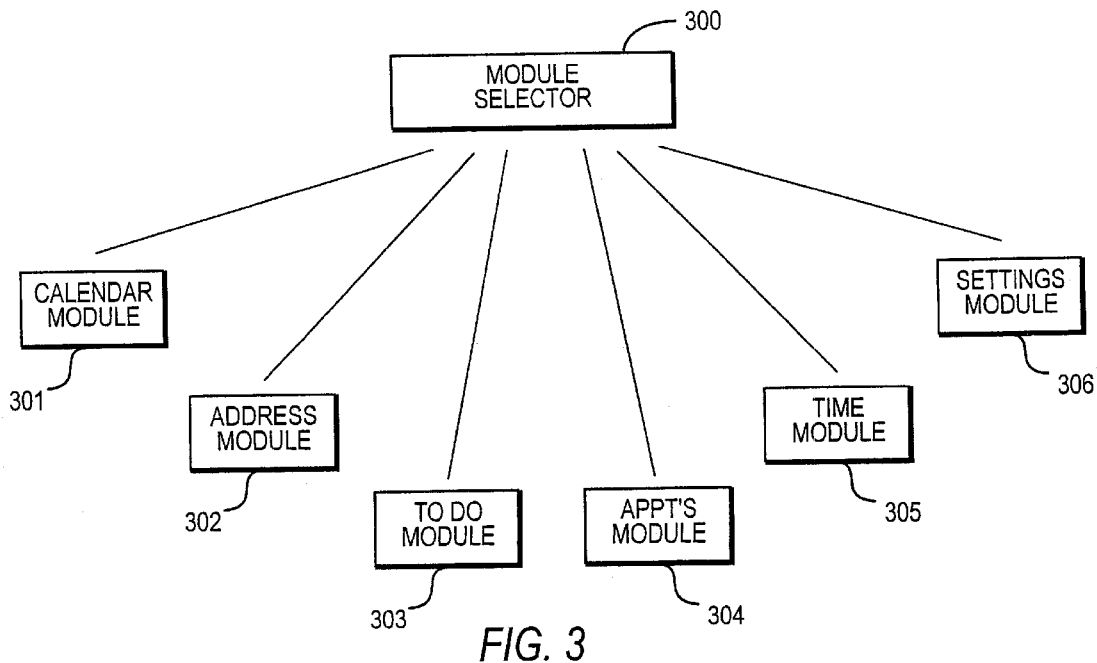
FIG. 3 is a block diagram illustrating implementation of application programs, which are controlled by a module selector.

Applications 213 are software application programs or modules provided for user operation of the device. As shown in FIG. 3, for instance, the application programs can be implemented as modules 301–306, which are controlled by a module selector 300. The module selector 300 serves as a user interface or shell representing the top-level or "home" display presented to a user. In the currently-preferred embodiment, the module selector 300 presents the user with selection icons for navigating to different applications or modules of functionality. In an exemplary embodiment, the applications include a contact module for addresses and phone numbers, a schedule module for calendar events, a "to do" list for various tasks, a memos module for arbitrary text documents, a world time module for clock settings and world travel time translations and a preferences module for various device settings and configurations. The applications interface with the phone through the phone's interface connector. For instance, a user can look up a phone number for a person in the contact module and press a button to initiate a call to that number.

In an exemplary embodiment, the device 100 is constructed from a modified REX™ portable device, such as Model REX-3 available from Franklin Electronic Publishers of Burlington, N.J., with the device being modified to accommodate the design of housing 105. Further description of the design and operation of the REX device is provided in commonly-owned U.S. patent application Ser. No. 08/905,463, filed Aug. 4, 1997, and entitled, User Interface Methodology for Microprocessor Device Having Limited User Input, the disclosure of which has been incorporated by reference.

2. User Interface a. Introduction

In the most-preferred embodiment, the user interface of the present invention implements a "single-click" style of button operation. Given a device with a small number of input buttons, for instance, various key combinations beyond the simple clicking of each individual button could be created. Buttons could, for example, be "double clicked" by users or combined to create double or triple (or even more) key combinations. Although such an approach yields more logical buttons from the available physical buttons, the approach requires users to memorize key combinations which are not intuitive (and are a source of endless grief for users of such devices). Accordingly, in the most-preferred embodiment, a single-click style is adopted, so that users can associate each button with a particular task for a given program context.

In addition to the single-click style, the preferred embodiment imposes "click consistency" for each button. Generally, the same buttons are used over and over again to perform their respective tasks, even though the user has navigated to different modules of an application. In this manner, the user is presented with a consistent interface or metaphor which can be easily mastered. If, on the other hand, behavior of the button changed from one portion or context of the application to another, the user must relearn the functionality of each button.

Also in the preferred embodiment, the user interface supports in a small form factor device the browser-style navigation that users have become accustomed to on desktop computers (e.g., using Web browsers). More particularly, the interface supports up, down, forward, and backward navigation for allowing a user to "drill down" or "drill across" his or her data. This allows the user to find a data item (link) of interest and then drill down into it. Once at the appropriate level, the user can then easily select the particular item of interest. Further, once the user has selected or entered an item, the system provides the ability for the user to return to "home" with a single button click. As set forth below, the present invention provides an interface allowing browser-style navigation in a device having a terse set of input keys.

b. Navigation Model

The module selector presents an array of icons, each one corresponding to a particular application within the system. At all times, the system displays a highlight on screen for indicating "focus"—that a particular item is the focus of further user input (at that point in time). At the top level or "home," focus is indicated by a highlight around one of the application icons.

Figure 4:
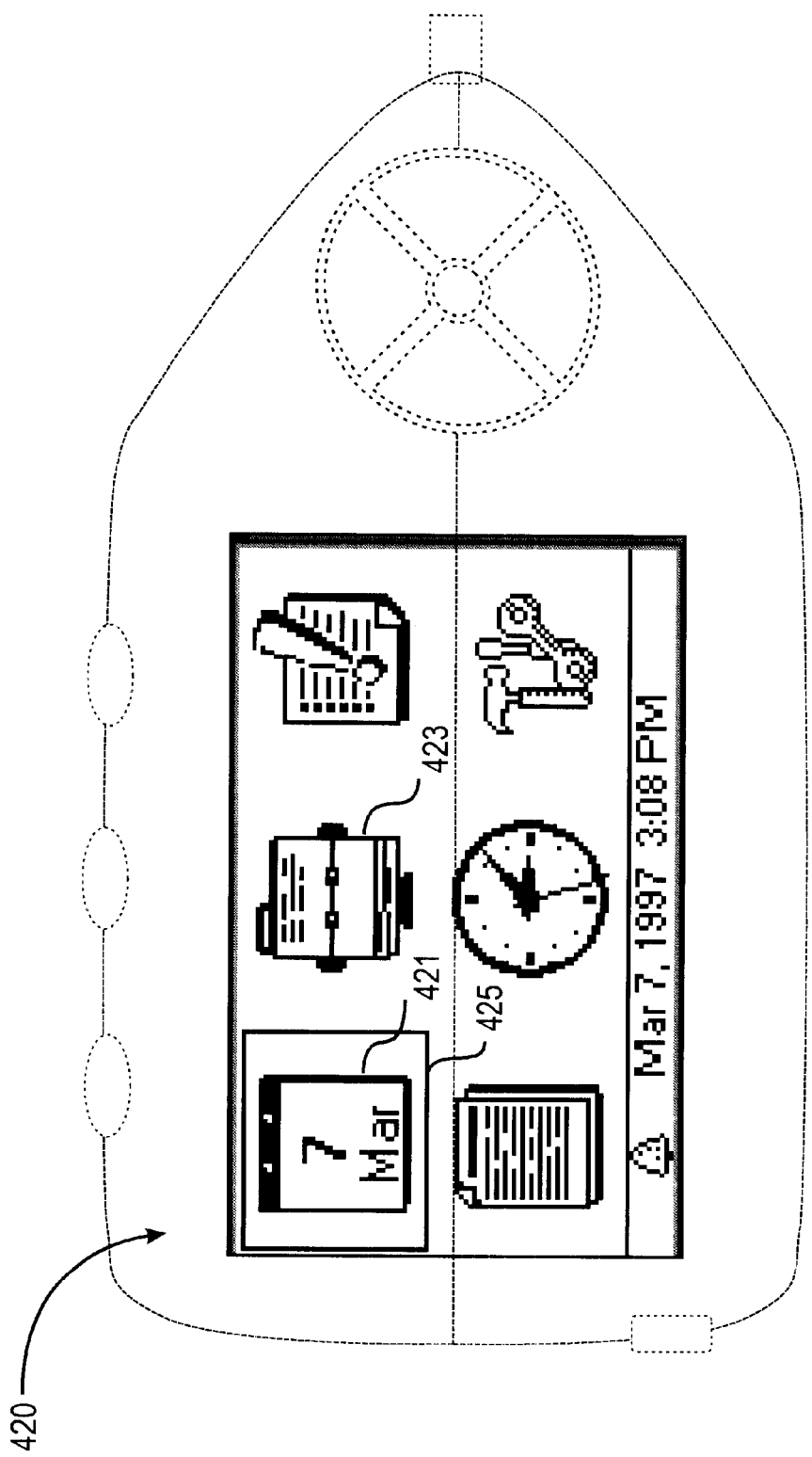
FIG. 4 is a bit map screen shot illustrating a display user interface, which comprises a plurality of application or module icons from which the user can invoke particular application functionality.

As shown in FIG. 4, for instance, display user interface 420 comprises a plurality of application or module icons (e.g., icons 421, 423), from which the user can invoke particular application functionality. As shown, icon 421 currently has "focus," as indicated by focus outline (rectangle) 425. Recall that the CDO device 100 includes a NaviDisk 120. These buttons function as follows. The forward or right button (e.g., button 122) and backward or left button (e.g., button 123) allow the user to navigate forward or backward (respectively), within a given level of the interface. For the top-level view shown by display 420, for instance, the forward and backward buttons move the selective or highlight from one icon to another, either in a forward or reverse direction depending on which of the two buttons or keys is activated. The up button (e.g., button 121) and down button (e.g., button 124) allow the user to navigate upward or downward (respectively), among levels of the interface. In the currently-preferred embodiment, a highlight or selector is presented at all levels of the interface, so that the functionality of the buttons remains consistent and intuitive. As a result, the user always knows how to shift focus from one item to another regardless of what level of the interface the user has navigated to.

Working in conjunction with the left, right, up, and down buttons that shift focus through a current level, a select button (e.g., button 125) invokes (or "selects") the item currently having focus, when the button is activated by the user. At the top-level view shown at 420, for instance, user activation of the select button serves to select the calendar module represented by icon 421. In response to this selection, the system "drills down" into the calendar module.

Using the select key in combination with the left, right, up, and down buttons, the user is easily able to navigate up and down interface levels as well as across a particular level. In other words, the buttons provide a navigation model where the user can move from point to point for changing direction within a level; selection itself always indicates the current focus or point of activity (which will occur) within a given level. Selecting that item with the select button causes the system to drill down into the functionality represented by the selected item.

The remaining buttons of the second set (i.e., set 150) can be programmed to augment this basic design. For instance, a home button can provide a browser-like key allowing a user to always return to "home"—that is, a general or overview display screen. Regardless of how many levels the user has drilled down into using this technique, the home button will always return the interface back to the top-level view (e.g., such as the "home" view represented by display 420). For the embodiment illustrated by FIG. 4, "home" is the module selector display or shell shown by display screen 420. In this manner, no matter how far a user has "drilled down" in the interface, the home key will always return the user to the top-level view or shell, with a single button click.

Another one of the buttons can be programmed to serve as a view switch button. A view switch button allows the user to instruct the system to switch to a different view within a given level, thus providing the user with a different way of viewing the data. Consider, for instance, presentation of calendar data by a calendar module. Calendar or time-related data can be represented or displayed in multiple ways. One way to represent such information, for example, is to display a linear (event-by-event) list. Alternatively, such information could be presented on a week-by-week basis—that is, viewing data over a span of a given week. Yet another way to view such information is a monthly view which highlights dates for a given month which have events (or other user data). The view switch, therefore, cycles through different views at a particular level, with the actual views available being dictated by the particular application (module). In order to simplify the interface for the user, the number of views available at a given level should typically not exceed about four views.

Further description of the construction and operation of a user interface suitable for a device having a terse set of input keys or buttons, such as the device 100, can be found in the abovementioned commonly-owned U.S. patent application Ser. No. 08/905,463, which has been incorporated by reference above.

E. Communication Methodologies

In accordance with the present invention, communication methodologies are provided for facilitating use of the organizer component with a host cellular phone. Exemplary methods include the following.

1. User-initiated Voice Call from the Organizer

Figure 5A:
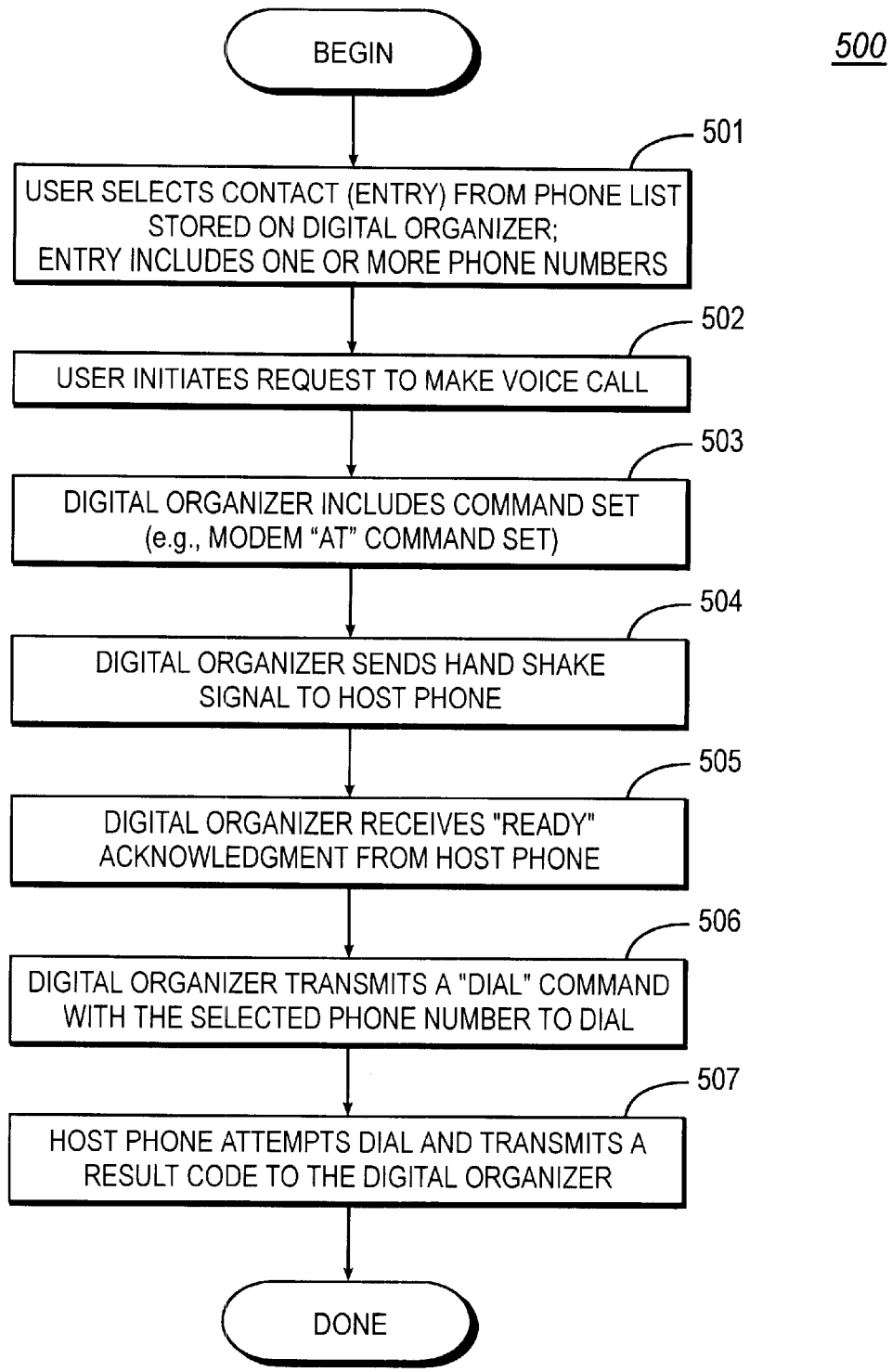
FIG. 5A is a flow chart illustrating a method of the present invention supporting user-initiated voice call from the organizer.

As previously described, the digital organizer (i.e., unit 100) is linked to a host cellular phone through a communication interface plug or connector (e.g., connector 160) which snaps into a corresponding communication interface port of the phone. As shown in FIG. 5A, a method 500 of the present invention supporting user-initiated voice call from the organizer includes the following steps. At step 501, the user selects a contact from a phone list stored in the organizer, which includes phone number information for each contact. If multiple phone numbers are available for a particular contact, the user selects one number to dial. The user can easily access contact information, using the previously-described navigation methodology of the preferred user interface. After the user selects a contact entry, the user selects an option requesting that the digital organizer make a voice call, as indicated by step 502. As indicated by step 503, the digital organizer includes a communication protocol or command set for communicating with the host phone. In this regard, a conventional command set may be employed, such as the standard modem "AT" command set, which is documented in the patent, trade, and technical literature; see e.g., U.S. Robotics' detailed references on the AT command set, currently available at http://ae.pcd.usr.com/techref/atref.htm, the disclosure of which is hereby incorporated by reference. As shown at step 504, the digital organizer attempts to get the attention of the host phone, by sending a hand shake signal. If acknowledgment from the host phone is not received before a time-out interval or set number of cycles, the communication session aborts. Such will be the case if the host phone is already on a voice call or is otherwise too busy servicing other requests. If, on the other hand, the host phone is available, it will send an acknowledgment message "ready" as shown in step 505. Upon receipt of an acknowledgment, the digital organizer packages the request and transmits it to the host phone, at step 506. For example, the digital organizer can transmit an AT command which includes the phone number to dial. Finally, the host phone returns a result code indicating "success" or "failure"; this is indicated at step 507. If desired, this result can be logged at the digital organizer. Thereafter, the voice call can proceed without further assistance from the digital organizer.

2. Synchronization of Host Phone List with Digital Organizer List

Figure 5B:
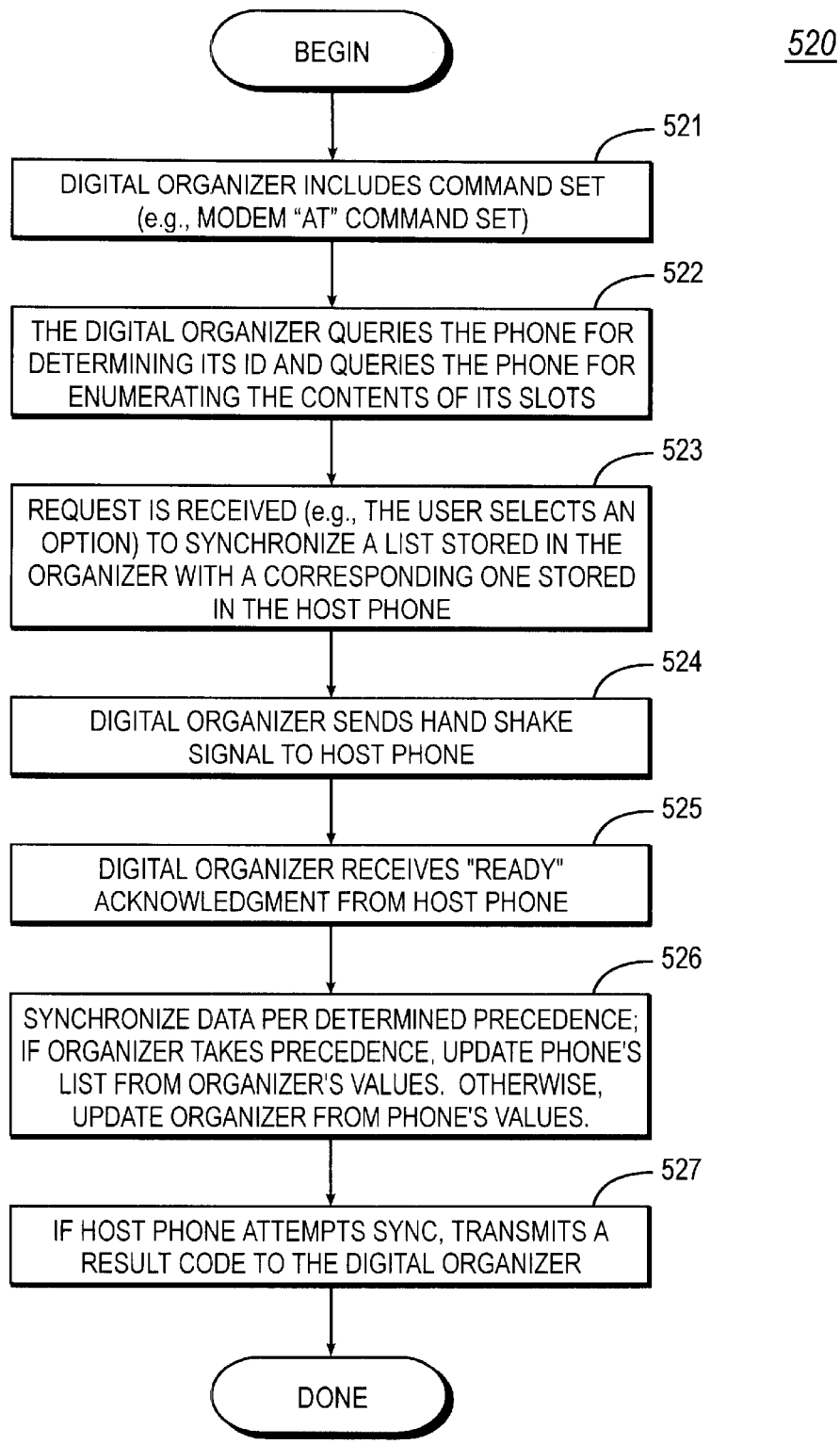
FIG. 5B is a flow chart illustrating a method of the present invention supporting synchronization of a host phone list (e.g., contact information list) with a corresponding digital organizer list.

As shown in FIG. 5B, a method 520 of the present invention supporting synchronization of a host phone list (e.g., contact information list) with a corresponding digital organizer list includes the following steps. As indicated by step 521, the digital organizer includes, as before, a communication protocol or command set (e.g., standard modem "AT" command set) for communicating with the host phone. The command set includes a command of allowing the digital organizer to query the host phone for discerning the currently-stored contents in the list of a particular phone. At some convenient time, such as during "boot up" of the digital organizer, the digital organizer queries the phone for determining its ID (to distinguish it from other phones which the organizer might be attached to) and queries the phone for enumerating the contents of its slots (i.e., list of data items), as shown at step 522. At this point, the digital organizer can (optionally) determine whether the list of the host phone is different from that of the organizer.

At step 523, a request is received (e.g., the user selects an option) to synchronize a list stored in the organizer with a corresponding one stored in the host phone. Alternatively the digital organizer is configured to initiate this request automatically, such as a user-specified interval or in response to some other user activity, or automatic detection of a difference between the lists (e.g., at "boot up" or upon receiving a user edit). In any event, at the conclusion of the step, the digital organizer has scheduled the task that it needs to synchronize its list with that of the host phone. In the currently-preferred embodiment, this is scheduled in a transaction queue as a task request specifying the updating (e.g., insert, delete, or modify) of a particular record, or set of records; the request includes the new value or values which require update.

The method proceeds to process the request as follows. As shown at step 524, the digital organizer attempts to get the attention of the host phone, by sending a hand shake signal.

If acknowledgment from the host phone is not received before a time-out interval or set number of cycles, the communication session aborts (in a manner similar to that previously described for step 504). If the host phone is available, it will send an acknowledgment message "ready" as shown in step 525.

Upon receipt of an acknowledgment, the digital organizer packages the synchronization request and transmits it to the host phone, at step 526. Although the host phone may include a unique identifier for each slot, it typically will not include any other support for synchronization, such as time stamps or the like. To accommodate this limitation of the host phone, the digital organizer stores a time stamp for each one of its own entries and a time stamp (per host phone) indicating when the last synchronization occurred. In the face of a disparity for entries at the organizer verses the phone, if the time stamps of the entries at the organizer are later than that of last synchronization, the values at the digital organizer takes precedence. Otherwise, the system assumes that the host phone is the authority (for last-entered changes), with the values at the host phone taking precedence. A user-configurable option can be provided for forcing a particular precedence, if desired. In the event that the organizer determines that its list takes precedence, the digital organizer transmits an AT command which includes the identifier (ID) for the slot (or slots) to update, together with relevant values. In the event that the list of the phone takes precedence, step 526 would operate such that the digital organizer would instead apply updates to its own list, based on values retrieved from the phone, from the abovementioned query. In the instance that the host phone performs synchronization (i.e., processes a "sync" request), it returns a result code indicating "success" or "failure"; this is indicated at step 527.

3. Protocol for Wireless and Wired Synchronization

Figure 5C:
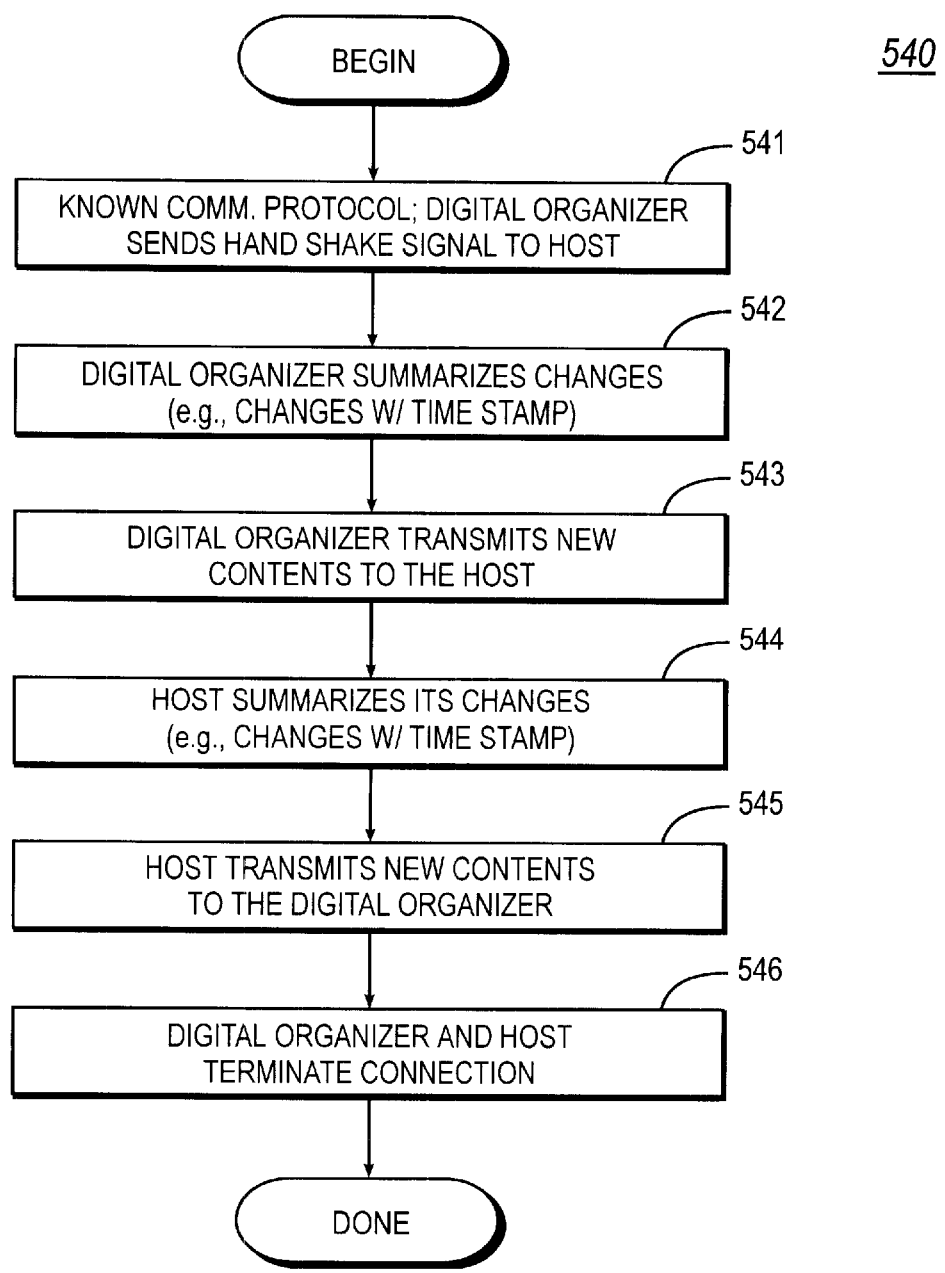
FIG. 5C is a flow chart illustrating a method of the present invention providing a synchronization protocol between the digital organizer and any host (e.g., PC or server).

As shown in FIG. 5C, a method 540 of the present invention providing a synchronization protocol between the digital organizer and any host (e.g., PC or server) includes the following steps. At step 541, the digital organizer and the host exchange a hand shake according to a known communication protocol (e.g., AT command set), thereby establishing a connection (session). At step 542, the digital organizer is asked to summarize any changes, based on the time (i.e., time stamp) of the last synchronization and time stamp of individual changes to its data. Here, changes include insertions, deletions, and modifications. The changes can be summarized quite simply, by submitting the identifiers or IDs for the items, together with corresponding time stamps (of the changes). At a later point in time, the digital organizer is asked for the new contents of any insertions or modifications; contents for any deletions is not required. This is indicated at step 543, where the digital organizer transmits data (i.e., new contents) to the host. In addition to this request asking for data, the digital organizer can be instructed at this point to make particular modifications to its data.

As illustrated by steps 544 and 545, the process operates bi-directionally, with the host transmitting its changes back to the digital organizer. For example, at step 544, the host summarizes any changes to its data and transmits that to the digital organizer. In addition to this request asking for data, the host can be instructed at this point to make particular modifications to its data. Then, in a manner corresponding to that done at step 543, the host transmits any new contents to the digital organizer, as shown at step 545. Ultimately, the digital organizer and the host terminate the communication session, as illustrated at step 546.

The foregoing protocol is suitable for use in both wireless and wired synchronization scenarios. In a wired synchronization scenario, the protocol is exercised over the serial connection from the digital organizer's serial jack to a host's serial jack (e.g., PC's RS-232 input jack). The same synchronization mechanism which allows for connectivity to a PC through the stereo jack can be applied to a serial connection made with a data call using the cellular phone itself. In this wireless synchronization scenario, the digital organizer first initiates a data phone call through the host cellular phone, using its command set. In this manner, the digital organizer effectively employs the host cellular phone as a serial modem for establishing a communication session or connection with a host computer. Once the session is established, the digital organizer can exercise the protocol over the connection. This wireless synchronization allows users to update their data via a synchronization service which is available anywhere the cell phone itself operates.

Additional methodologies supporting synchronization and/or reconciliation of individual data items are described in commonly-owned U.S. patent application Ser. No. 08/923,612, filed Sep. 4, 1997, and entitled, System and Methods for Synchronizing Information Among Disparate Datasets, the disclosure of which is hereby incorporated by reference. Still further description can be found in commonly-owned U.S. patent application Ser. No. 09/020,047, filed Feb. 6, 1998, and entitled, Methods for Mapping Data Fields from One Data Set to Another in a Data Processing Environment, the disclosure of which is hereby incorporated by reference.

F. Integrated Messaging Through Addition of Pager Functionality

Because of the limited battery life of cellular phones, many cellular phone users leave their phones off and, instead, carry around a pager to receive pages. Only upon receiving a page will the user at that time initiate a voice call to call the paging party back. Although this approach provides a workable solution, it is not an attractive one. In particular, the approach requires the user to also carry around an extra device, the pager, which can be bulky. These users would benefit from having the one-way paging mechanism integrated into the CDO device itself. In accordance with the present invention, the organizer component is adapted in an alternative embodiment to include paging circuitry suitable for receiving pages. Since the organizer component maintains a separate power supply, the user can receive pages without relying on the limited battery life of the cellular phone.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A method for dialing a telephone number at a phone, from a hand-held digital organizer, where, initially, the digital organizer is physically detached from the phone, the method comprising:

physically attaching the hand-held digital organizer to the phone by a user to establish a mechanical attachment and an electrical connection between the digital organizer and the phone to form a single integrated hand-held unit;

receiving user input at the digital organize, indicating a request to dial a phone number stored in the digital organizer;

sending a first command from the digital organizer to the phone for attempting to establish a communication session between the digital organizer and the phone;

if an acknowledgment message is not received from the phone at the digital organizer, aborting the attempted communication session, or, if an acknowledgment message is received from the phone at the digital organizer, transmitting a second command from the digital organizer to the phone which instructs the phone to dial the phone number;

physically detaching the digital organizer from the phone by a user;

receiving a request to synchronize a phone list stored on the phone with a corresponding list stored on the digital organizer;

transmitting a third command from the digital organizer to the phone requesting synchronization between the list stored on the digital organizer and the list stored on the phone;

determining which list takes precedence during synchronization; and if the list stored on the digital organizer takes precedence, updating the list stored at the phone from the list stored at the digital organizer, otherwise updating the list stored at the digital organizer from the list stored at the phone.

2. A method for communicating between a hand-held digital organizer and a phone, with a first set of phone numbers being stored in the digital organizer and a second set of phone numbers being stored in the phone, the method comprising:

establishing a communication interface between the digital organizer and the phone;

receiving a first input at the digital organizer indicating a user request to dial a particular phone number from the first set of phone numbers;

sending a first command from the digital organizer to the phone to establish a communication session between the digital organizer and the phone;

transmitting a second command from the digital organizer to the phone which instructs the phone to dial the particular phone number;

receiving a second input at the digital organizer requesting synchronization of the first set of phone numbers in the digital organizer with the second set of phone numbers in the phone; and performing a synchronization between the first set of phone numbers in the digital organizer and the second set of phone numbers in the phone.

3. A method for communicating between a hand-held digital organizer and a phone, with a first set of phone numbers being stored in the digital organizer and a second set of phone numbers being stored in to phone, the method comprising:

establishing a communication interface between the digital organizer and the phone;

receiving a first input at the digital organizer indicating a user request to dial a particular phone number from the first set of phone numbers;

sending a first command from the digital organizer to the phone to establish a communication session between the digital organizer and the phone;

transmitting a second command from the digital organizer to the phone which instructs the phone to dial the particular phone number;

receiving a second input at the digital organizer requesting synchronization of the first set of phone numbers in the digital organizer with the second set of phone numbers in the phone; and performing a synchronization between the first set of phone numbers in the digital organizer and the second set of phone numbers in the phone, wherein the step of performing the synchronization comprises:

transmitting a third command from the digital organizer to the phone requesting the synchronization;

determining which set of phone numbers takes precedence during synchronization; and if the first set of phone numbers in the digital organizer takes precedence, updating the second set of phone numbers in the phone from the first set of phone numbers in the digital organizer, otherwise updating the first set of phone numbers in the digital organizer from the second set of phone numbers in the phone.

4. The method of claim 3, further comprising:

sending a query request from the digital organizer to the phone, so that the digital organizer can determine contents of the second set of phone numbers in the phone.

5. The method of claim 4, wherein said query request is transmitted at boot up of the digital organizer.

6. The method of claim 4, wherein said query request is transmitted in response to a user edit.

7. The method of claim 3, wherein said updating comprises inserting, deleting, and modifying information as needed for synchronizing the sets of phone numbers.

8. The method of claim 3, wherein said request to synchronize occurs in response to user input.

9. The method of claim 3, wherein the step of establishing a communication interface comprises:

physically attaching the digital organizer to the phone to establish an electrical connection.

10. The method of claim 9, wherein said phone is a cellular phone accommodating a battery, and wherein said physically attaching step comprises attaching the digital organizer to the phone at a location intended for attaching a battery, so that the electrical connection between the digital organizer and the phone occurs at the same location as the electrical connection between a battery and the phone.

11. The method of claim 3, wherein said first command comprises an attention command.

12. The method of claim 3, wherein the digital organizer and the phone share a command set protocol.

13. The method of claim 12, wherein said command set protocol comprises an AT modem command set.

14. The method of claim 3, further comprising:

sending a message from the phone to the digital organizer for indicating whether the phone successfully updated its set of phone numbers, when the second set of phone numbers in the phone is updated from the first set of phone numbers in the digital organizer.

15. The method of claim 14, wherein said message comprises a success code if the phone successfully updated its set of phone numbers.

16. The method of claim 3, wherein said first command comprises a hand shake signal.

17. The method of claim 3, wherein each set of phone numbers comprises a contact list storing contact names together with contact phone numbers.

18. The method of claim 3, wherein said step of determining which set of phone numbers takes precedence is based on user preference.

19. The method of claim 3, wherein said step of determining which set of phone numbers takes precedence includes:

storing at least one time stamp for the set of phone numbers in the digital organizer for indicating when the first set of phone numbers was last modified; and storing a time stamp for indicating when the second set of phone numbers in the phone was last synchronized with the first set of phone numbers in the digital organizer.

20. The method of claim 19, wherein the digital organizer takes precedence if said at least one time stamp for the first set of phone numbers in the digital organizer is later in time than the time stamp indicating last synchronization.

21. The method of claim 19, wherein the phone takes precedence if said at least one time stamp for the first set of phone numbers in the digital organizer is not later in time than the time stamp indicating last synchronization.

22. The method of claim 19, further comprising:

storing information indicating an identity for the phone, so that the time stamp indicating last synchronization can be associated with the phone.

23. A handheld communication and information storage system, the system comprises:

a handheld wireless telephone for placing and receiving wireless telephone calls, the telephone comprising a speaker, a microphone, an input device for entering telephone numbers, a communication interface, and a power supply, a handheld digital organizer for storing user data, including telephone numbers, the organizer comprising a display, an input device, a memory, a processor, a communication interface and a power supply; and an attachment mechanism to enable a user to mechanically and electrically attach the organizer to the telephone to form a single integrated handheld unit, with the communication interface of the telephone connected to the communication interface of the organizer, the attachment mechanism also enabling the user to detach the organizer from the telephone, wherein when the organizer is attached to the telephone, the user may select a phone number in the organizer to be dialed on the telephone, the organizer communicates the selected phone number to the telephone and the telephone places a call using the selected phone number, and when the organizer is detached from the telephone, the organizer may be used as a stand-alone digital organizer to store and retrieve user data, and the telephone may be used as a stand-alone wireless telephone to place and receive wireless telephone calls, wherein the organizer contains a first set of phone numbers, the telephone contains a second set of phone numbers and, when the organizer is attached to the telephone, the user may cause the first set of phone numbers and the second set of phone numbers to be synchronized between the organizer and the telephone.

24. The handheld communication and information storage system of claim 23, wherein the synchronization of the first set of phone numbers and the second set of phone numbers comprises determining which set of phone numbers takes precedence and updating the set of phone numbers that does not take precedence from the set of phone numbers that does take precedence.

25. The handheld communication and information storage system of claim 23, wherein the attachment mechanism enables the organizer to attach to the telephone in the same manner that an auxiliary battery would attach to the telephone.

26. The handheld communication and information storage system of claim 23, wherein the attachment mechanism secures the organizer to the telephone in a rigid manner when the organizer is attached to the telephone.

* * * * *